Patented Feb. 23, 1954

2,670,351

UNITED STATES PATENT OFFICE 2,670,351

NEW PYRIMIDINE COMPOUNDS AND PROCESSES FOR THEIR PREPARATION

Robert Michel Jacob, Ablon-sur-Seine, France, assignor to Societe des Usines Chimiques Rhone-Poulenc, Paris, France, a French body corporate No Drawing. Application December 17, 1952, Serial No. 326,599

Claims priority, application France January 30, 1952

9 Claims. (Cl. 260—256.4)

This invention relates to new pyrimidine compounds having valuable chemotherapeutic properties, in particular powerful amoebicidal activity.

The compounds of the present invention are chlorinated derivatives of pyrimidine having the general formula:

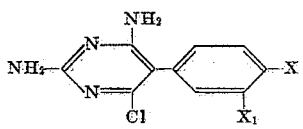

(where X is selected from the group consisting of a chlorine atom, and the nitro, amino and methoxy radicals, and $X_1$ is selected from the group consisting of hydrogen and chlorine atoms and nitro and methoxy radicals) and their acid addition salts.

Bases of the foregoing formula and their salts may be obtained, in accordance with a feature of this invention, by a process which comprises reacting with ammonia at a temperature of from 50–120° C. and preferably at around 100° C. a member of the group consisting of the corresponding 2 - amino - 4:6 - dichloropyrimidine, 2-acetamido-4:6-dichloropyrimidine and 2:4:6-trichloropyrimidine.

Nitro- or amino-containing bases of the foregoing formula and their salts may also be prepared, in accordance with a still further feature of this invention, by a process which comprises introducing one or more nitro or amino substituents into the phenyl nucleus (viz. at X and/or $X_1$) of 2:4-diamino-5-phenyl-6-chloropyrimidine by methods known per se for introducing such substituents into a phenyl nucleus. Thus, for example, there may be obtained by nitration the product 2:4 - diamino - 5 - (4' - nitrophenyl) - 6-chloropyrimidine which, by reduction, may be converted to the product 2:4-diamino-5-(4'-aminophenyl)-6-chloropyrimidine.

The new bases of this invention may readily be converted to salts by the normal methods known for converting organic bases into their salts. Both the bases and their salts with acids normally giving non-toxic salts have valuable chemotherapeutic properties, and in particular powerful amoebicidal activity, and are therefore of importance in human and veterinary medicine. They may also serve as intermediate products for the preparation of other compounds having valuable chemotherapeutic properties.

The following examples serve to illustrate the invention:

Example I 14.3 g. of 2:4:6-trichloro-5-(3':4'-dichlorophenyl)-pyrimidine, 100 cc. of ethanol and 32 g. of ammonia are heated for 6 hours at 100–120° C. with agitation in an autoclave. After cooling, the mixture is filtered and the residue is washed with ethanol and dried. In this way 5.5 g. of 2:4-diamino-5-(3':4'-dichlorophenyl)-6-chloropyrimidine having a melting point (Maquenne) of 270° C. are obtained. This product is purified by conversion to the hydrochloride, recrystallisation of the hydrochloride from aqueous ethanol, and conversion of the hydrochloride with ammonia, when it has a melting point of 273° C. (Maquenne).

The initial 2:4:6-trichloro-5-(3':4'-dichlorophenyl)-pyrimidine having a melting point of 157° C. (Kofler) is obtained by the action of phosphorus oxychloride in the presence of dimethylaniline on 3':4'-dichloro-5-phenyl-barbituric acid.

Example II 10 g. of 2 - acetamido - 4:6 - dichloro - 5 - (4'-chlorophenyl)-pyrimidine and 200 cc. of an 8 N. alcoholic ammonia solution are introduced into an autoclave. The mixture is heated at 95° C. for 8 hours. The crystals formed are filtered off, the mother liquors are concentrated for the purpose of separating further crystals and the different fractions obtained in this way are combined. The combined product is recrystallised from 525 cc. of absolute alcohol. In this way there are obtained 3.7 g. of 2:4-diamino-5 - (4' - chlorophenyl) - 6 - chloropyrimidine (M. P.=266–267° C.).

Example III

By a process as described in Example I but using 48 g. of 2:4:6-trichloro-5-(3':4'-dimethoxyphenyl)-pyrimidine, 480 cc. of ethanol and 316 g. of ammonia, there are obtained 28 g. of crude 2:4-diamino-5-(3':4'-dimethoxyphenyl)-6-chloropyrimidine having a melting point of 330° C. (Maquenne). Conversion of the product to the hydrochloride, recrystallisation of the hydrochloride from aqueous methanol, and conversion of the hydrochloride with ammonia gives a pure product having a melting point of 365–367° C. (Maquenne).

The initial 2:4:6-trichloro-5-(3':4'-dimethoxyphenyl)-pyrimidine having a melting point of 136° C. (Kofler) is obtained by the action of phosphorus oxychloride on the corresponding barbituric acid.

Example IV 40 g. of 2:4-diamino-5-phenyl-6-chloropyrimidine (Chase, J. Chem. Soc. 1951, 3,439) are introduced into 316 cc. of sulphuric acid (66° Bé.), the temperature being allowed to rise to about 50° C. After dissolution, the mixture is cooled to —5° C. and 18.3 g. of potassium nitrate are added in the course of 1 hour while maintaining the mixture at this temperature. After agitating the mixture for a further hour at —5° C. the reaction mass is then poured onto a mixture of 2.5 kg. of crushed ice and 1 litre of water. The resulting mixture is rendered alkaline with caustic soda; the precipitate formed is filtered, washed and dried. 46 g. of crude base are obtained. This base is purified by dissolving it in 1:1 litres of boiling ethanol containing 50 cc. of hydrochloric acid (density 1.19), filtering the solution whilst hot and rendering the filtrate alkaline with ammonia. The product is filtered, washed and dried. In this way there are obtained 38 g. of 2:4 - diamino - 5 - (4' - nitrophenyl)-6-chloropyrimidine having a melting point of 270–275° C. (Maquenne).

On dissolving this base in concentrated hydrochloric acid and adding water, there crystallises a hydrated hydrochloride having a melting point of 250–255° C. (Maquenne).

Example V 20 g. of 2:4-diamino-5-(4'-nitrophenyl)-6-chloropyrimidine produced by a process as described in Example IV are dissolved at 70° C. in 500 cc. of water together with 100 cc. of concentrated hydrochloric acid (density 1.19). 15 g. of granulated tin are added in portions to the resulting hot solution, and after 30 minutes the reduction is complete. The resulting mixture is cooled to about 15° C. and rendered alkaline with 175 cc. of caustic soda solution (density 1.33). The precipitate produced is filtered off, washed with water and taken up in 160 cc. of boiling ethanol. After filtering the hot solution in the presence of charcoal, it is allowed to crystallise by cooling. The crystals are filtered off, washed and dried. In this way there are obtained 11 g. of 2:4-diamino-5-(4'-aminophenyl)-6-chloropyrimidine having a melting point of 214° C. (Kofler).

I claim:
1. A member of the class consisting of the bases of the general formula:

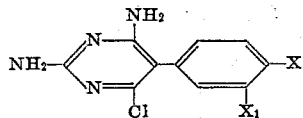

and of the non-toxic acid salts of such bases, where X is selected from the group consisting of a chlorine atom and a nitro, amino and a methoxy radical, and $X_1$ is selected from the group consisting of a hydrogen and a chlorine atom and a nitro and a methoxy radical.

2. 2:4 - diamino - 5 - (3':4' - dichlorophenyl)-6-chloropyrimidine.
3. 2:4 - diamino - 5 - (4' - chlorophenyl) - 6-chloropyrimidine.
4. 2:4 - diamino - 5 - (3':4' - dimethoxyphenyl)-6-chloropyrimidine.
5. 2:4 - diamino - 5 - (4' - nitrophenyl) - 6-chloropyrimidine.
6. 2:4 - diamino - 5 - (4' - aminophenyl) - 6-chloropyrimidine.
7. Process for the production of bases of the general formula:

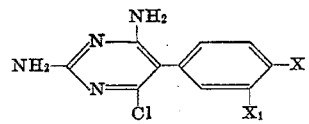

and the non-toxic acid salts of such bases, where X is selected from the group consisting of a chlorine atom and a nitro, amino and a methoxy radical, and $X_1$ is selected from the group consisting of a hydrogen and a chlorine atom and a nitro and a methoxy radical, which comprises reacting with ammonia at a temperature of from 50–120° C. a member of the group consisting of 2-amino-4:6-dichloropyrimidine, 2-acetamido-4:6-dichloropyrimidine and 2:4:6-trichloropyrimidine, each substituted in the 5-position in the manner required in the end product.

8. Process for the production of 2:4-diamino-5-(4'-nitrophenyl)-6-chloropyrimidine, which comprises nitrating 2:4-diamino-5-phenyl-6-chloropyrimidine.

9. Process for the production of 2:4-diamino-5-(4'-aminophenyl)-6-chloropyrimidine, which comprises nitrating 2:4-diamino-5-phenyl-6-chloropyrimidine, and reducing the 2:4-diamino-5-(4'-nitrophenyl)-6-chloropyrimidine so produced to 2:4-diamino-5-(4'-aminophenyl)-6-chloropyrimidine.

ROBERT MICHEL JACOB.

No references cited.